(12) United States Patent
Ding et al.

(10) Patent No.: US 11,720,748 B2
(45) Date of Patent: Aug. 8, 2023

(54) AUTOMATICALLY LABELING DATA USING CONCEPTUAL DESCRIPTIONS

(71) Applicant: Robert Bosch GmbH, Stuttgart (DE)

(72) Inventors: Haibo Ding, Santa Clara, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 16/859,695

(22) Filed: Apr. 27, 2020

(65) Prior Publication Data

US 2021/0334596 A1    Oct. 28, 2021

(51) Int. Cl.
  *G06F 40/211*    (2020.01)
  *G06N 20/00*    (2019.01)
  *G06F 40/284*    (2020.01)
  *G06F 40/169*    (2020.01)
  *G06F 18/214*    (2023.01)

(52) U.S. Cl.
  CPC ........ *G06F 40/211* (2020.01); *G06F 18/2155* (2023.01); *G06F 40/169* (2020.01); *G06F 40/284* (2020.01); *G06N 20/00* (2019.01)

(58) Field of Classification Search
  CPC .... G06K 9/6259; G06K 9/6256; G06N 20/00; G06F 40/284; G06F 40/211; G06F 40/169; G06F 18/214; G06F 18/2155
  See application file for complete search history.

(56) References Cited

U.S. PATENT DOCUMENTS

| | | | |
|---|---|---|---|
| 7,461,044 B2 | 12/2008 | Salahshour et al. | |
| 8,805,845 B1 * | 8/2014 | Li | G06F 16/9024 707/738 |
| 9,639,818 B2 | 5/2017 | Shami | |
| 9,792,562 B1 | 10/2017 | Chen et al. | |
| 10,002,371 B1 * | 6/2018 | Baker | G06F 16/24578 |
| 10,269,450 B2 | 4/2019 | Rhodes et al. | |

(Continued)

OTHER PUBLICATIONS

"Snorkel: The System for Programmatically Building and Managing Training Data" printed Apr. 24, 2020 https://www.snorkel.org/.

(Continued)

*Primary Examiner* — Angela A Armstrong
(74) *Attorney, Agent, or Firm* — Michael Best & Friedrich LLP

(57) ABSTRACT

A system for automatically labeling data using conceptual descriptions. In one example, the system includes an electronic processor configured to generate unlabeled training data examples from one or more natural language documents and, for each of a plurality of categories, determine one or more concepts associated with a conceptual description of the category and generate a weak annotator for each of the one or more concepts. The electronic processor is also configured to apply each weak annotator to each training data example and, when a training data example satisfies a weak annotator, output a category associated with the weak annotator. For each training data example, the electronic processor determines a probabilistic distribution of the plurality of categories. For each training data example, the electronic processor labels the training data example with a category having the highest value in the probabilistic distribution determined for the training data example.

16 Claims, 5 Drawing Sheets

(56) References Cited

U.S. PATENT DOCUMENTS

| | | | | |
|---|---|---|---|---|
| 2011/0231347 | A1* | 9/2011 | Xu | G06F 16/951 |
| | | | | 706/50 |
| 2016/0170997 | A1 | 6/2016 | Chandrasekaran et al. | |
| 2019/0354583 | A1 | 11/2019 | Ralhan | |
| 2021/0124876 | A1* | 4/2021 | Kryscinski | G06K 9/6259 |
| 2021/0241162 | A1* | 8/2021 | Asadorian | G06N 5/04 |
| 2022/0207240 | A1* | 6/2022 | Björkqvist | G06F 3/0484 |

OTHER PUBLICATIONS

Ratner et al., "Snorkel: Rapid Training Data Creation with Weak Supervision," arXiv:1711.10160v1 [cs.LG] Nov. 28, 2017.

* cited by examiner

FIG. 3

The physiological needs include: (1) the need to be able to breathe beneficial or pleasant air, and to avoid unpleasant air; (2) the need to avoid hunger, to avoid unpleasant food, and to eat or obtain pleasing food; (3) the need to avoid thirst, to avoid unpleasant beverages, and to drink or obtain pleasing beverages; (4) the need to sleep, regularly and comfortably; (5) the need to maintain warmth of the human body, to not be too hot or too cold; (6) the need to have or obtain shelter (i.e., a place to live or stay) and to avoid unpleasant shelters.

FIG. 4

| | A(food) | A(eat) | A(beverage) | A(broke) |
|---|---|---|---|---|
| TRAINING DATA EXAMPLE-1 | Physiological | Physiological | | |
| TRAINING DATA EXAMPLE-2 | | | | Health |

FIG. 5

| | Physiological Needs | Health Needs | Social Needs | ... |
|---|---|---|---|---|
| TRAINING DATA EXAMPLE-1 | 0.8 | 0.1 | 0.1 | |
| TRAINING DATA EXAMPLE-2 | 0.5 | 0.4 | 0.1 | |
| ... | | | | |

AUTOMATICALLY LABELING DATA USING CONCEPTUAL DESCRIPTIONS

SUMMARY

Classification is an important aspect of natural language processing and may automatically be performed by a machine learning system. For example, a machine learning system may receive a passage from a natural language document (for example, a news article, a periodical, or the like) and classify the passage as belonging to a category (for example, sports, entertainment, human interest, or the like). A natural language passage could include a part of a sentence or a single sentence. In order to classify natural language passages, machine learning systems are trained using training data composed of a large number of training examples. A training example that is used to train a machine learning system is a natural language passage that has been labeled or classified as belonging to a category.

Most existing methods for training a machine learning system to classify a natural language passage rely on manually labeled training examples to train the machine learning system. Generating a large number of manually labeled training examples is both time consuming and expensive as it requires a human to review each passage included in the training data and, based on their review of the passage, determine a category that best describes the passage and to label the passage with. It is often impractical to collect sufficient manually labeled training examples for each different task that a machine learning system may be configured to perform. For example, a first organization may desire that a machine learning system be configured to classify passages from sports articles by the type of sport they describe (for example, soccer, track and field, tennis, basketball, or the like) while a second organization may desire that a machine learning system be configured to classify passages from novels by the type of genre the novel belongs to (for example, science fiction, fantasy, or the like). There is no overlap in the tasks the first organization and the second organization desire the machine learning system to perform and, in order to train a machine learning system to perform each of the tasks, two different training sets will need to be generated. Based on the above example, it is easy to see how the number of training examples required to train the machine learning system can grow exponentially as the number of tasks the machine learning system is required to perform grows.

Embodiments described herein provide, among other things, a system and method for automatically labeling training data examples to be used to train a machine learning system based on conceptual descriptions of each possible category or label that may be associated with the training data example. Therefore, the systems and methods described herein allow significant amount of man hours usually required to generate a training set to be saved.

One embodiment provides an example system for automatically labeling data using conceptual descriptions. The system includes an electronic processor configured to generate unlabeled training data examples from one or more natural language documents and, for each of a plurality of categories, determine one or more concepts associated with a conceptual description of the category and generate a weak annotator for each of the one or more concepts. The electronic processor is also configured to apply each weak annotator to each training data example and, when a training data example satisfies a weak annotator, output a category associated with the weak annotator. For each training data example, the electronic processor determines a probabilistic distribution of the plurality of categories. The probabilistic distribution represents, for each of the plurality of categories, a likelihood that the category is a correct label for the training data example. For each training data example, the electronic processor labels the training data example with a category having the highest value in the probabilistic distribution determined for the training data example.

Another embodiment provides an example method for automatically labeling data using conceptual descriptions. The method includes generating, with an electronic processor, unlabeled training data examples from one or more natural language documents and, for each of a plurality of categories, determining one or more concepts associated with a conceptual description of the category and generating a weak annotator for each of the one or more concepts. The method also includes applying each weak annotator to each training data example and, when a training data example satisfies a weak annotator, outputting a category associated with the weak annotator. The method further includes, for each training data example, determining a probabilistic distribution of the plurality of categories. The probabilistic distribution represents, for each of the plurality of categories, a likelihood that the category is a correct label for the training data example. The method includes, for each training data example, labeling the training data example with a category having the highest value in the probabilistic distribution determined for the training data example.

Other aspects, features, and embodiments will become apparent by consideration of the detailed description and accompanying drawings.

BRIEF DESCRIPTION OF THE DRAWINGS

FIG. 3 is an example conceptual description according to one embodiment.

FIG. 4 is an example label matrix according to one embodiment.

FIG. 5 is an example probabilistic matrix according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors configured in centralized or distributed fashions. In some instances, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
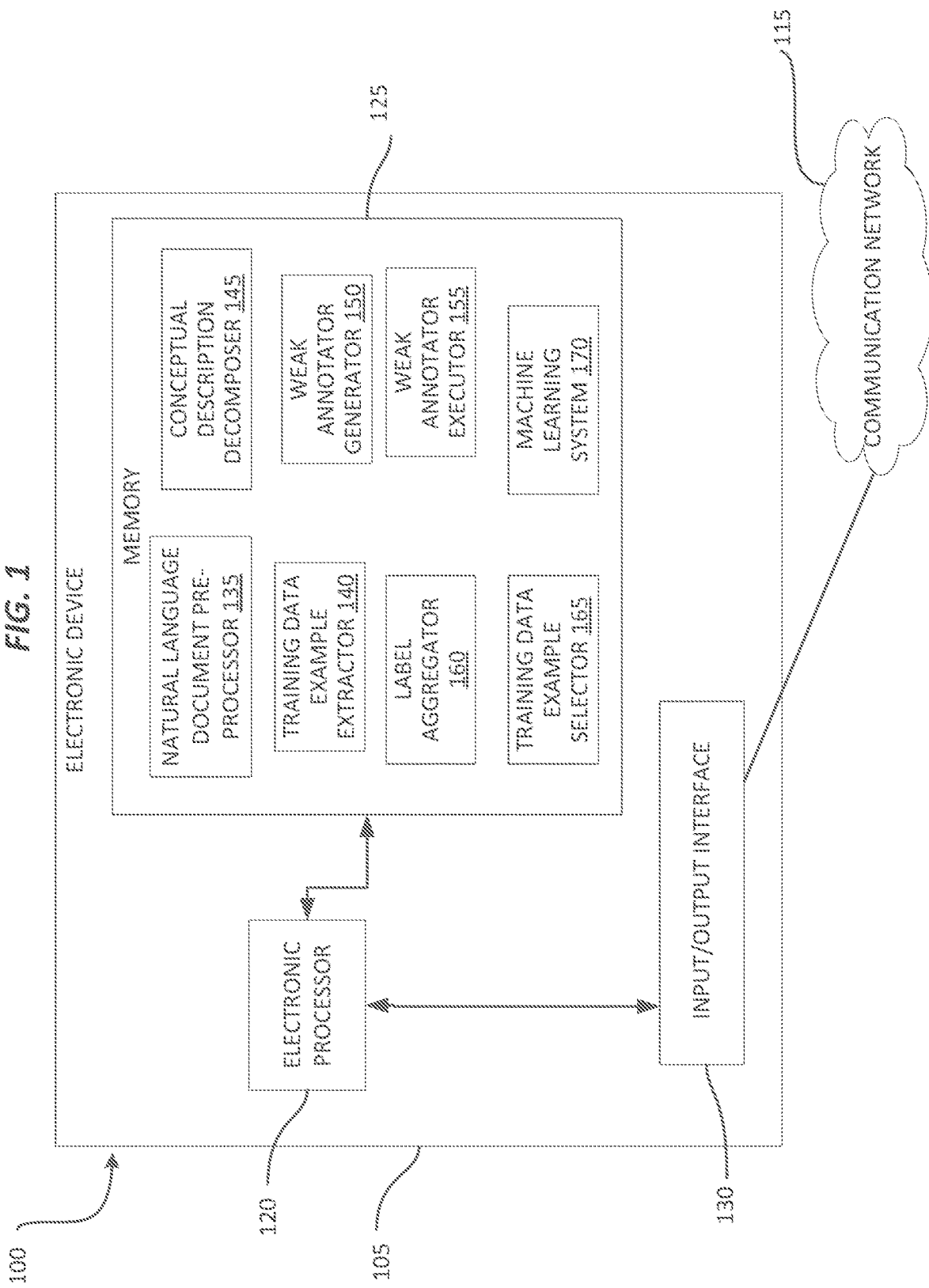
FIG. 1 is a block diagram of an example system for automatically labeling data using conceptual descriptions according to one embodiment.

FIG. 1 illustrates an example system 100 for automatically labeling data using conceptual descriptions. The system 100 includes an electronic device 105. The electronic device 105 may be a laptop or desktop computer, a tablet computer, smart phone, a server, or other computing device. In some embodiments, the electronic device 105 communicates over a communication network 115 with one or more other electronic devices. In one example, the electronic device 105 may be a server in communication with one or more electronic devices (for example, database servers) which the electronic device 105 receives natural language documents or passages from. The communication network 115 includes one or more wired networks, wireless networks, or a combination thereof that enable communications within the system 100. For example, in some configurations, the communication network 115 includes cable networks, the Internet, local area networks (LANs), wide area networks (WAN), mobile telephone networks (MTNs), and other types of networks, possibly used in conjunction with one another, to facilitate communication between the electronic device 105 and other electronic devices included in the system 100.

The embodiment illustrated in FIG. 1 provides but one example of the components and connections of the system 100. Components and connections may be constructed in other ways than those illustrated and described herein.

The electronic device 105 includes a plurality of electrical and electronic components that provide power, operation control, and protection to the components and modules within the electronic device 105. The electronic device 105 includes, among other things, an electronic processor 120 (such as a programmable electronic microprocessor, microcontroller, or similar device), a memory 125 (for example, non-transitory, computer readable memory), and an input/output interface 130. The electronic processor 120 is communicatively connected to the memory 125 and the input/output interface 130. The electronic processor 120, in coordination with the memory 125 and the input/output interface 130, is configured to implement, among other things, the methods described herein. It should be understood that the electronic device 105 may also include one or more input devices (for example, scanners) that capture all or part of natural language documents.

As will be described in further detail below, the memory 125 includes computer executable instructions for automatically labeling data using conceptual descriptions. In the example illustrated in FIG. 1, the memory 125 includes a natural language document pre-processor 135, a training data example extractor 140, a conceptual description decomposer 145, a weak annotator generator 150, a weak annotator executor 155, a label aggregator 160, a training data example selector 165, and a machine learning system 170, each of which are described in further detail below in relation to the method 200.

In some embodiments, the electronic device 105 may be implemented in several independent controllers (for example, programmable electronic controllers) each configured to perform specific functions or sub-functions. Additionally, the electronic device 105 may contain sub-modules that include additional electronic processors, memory, or application specific integrated circuits (ASICs) for handling input/output functions, processing of signals, and application of the methods listed below. In other embodiments, the electronic device 105 includes additional, fewer, or different components. Thus, the functions performed by the method 200 may also be distributed among one or more processors and one or more memories.

Figure 2:
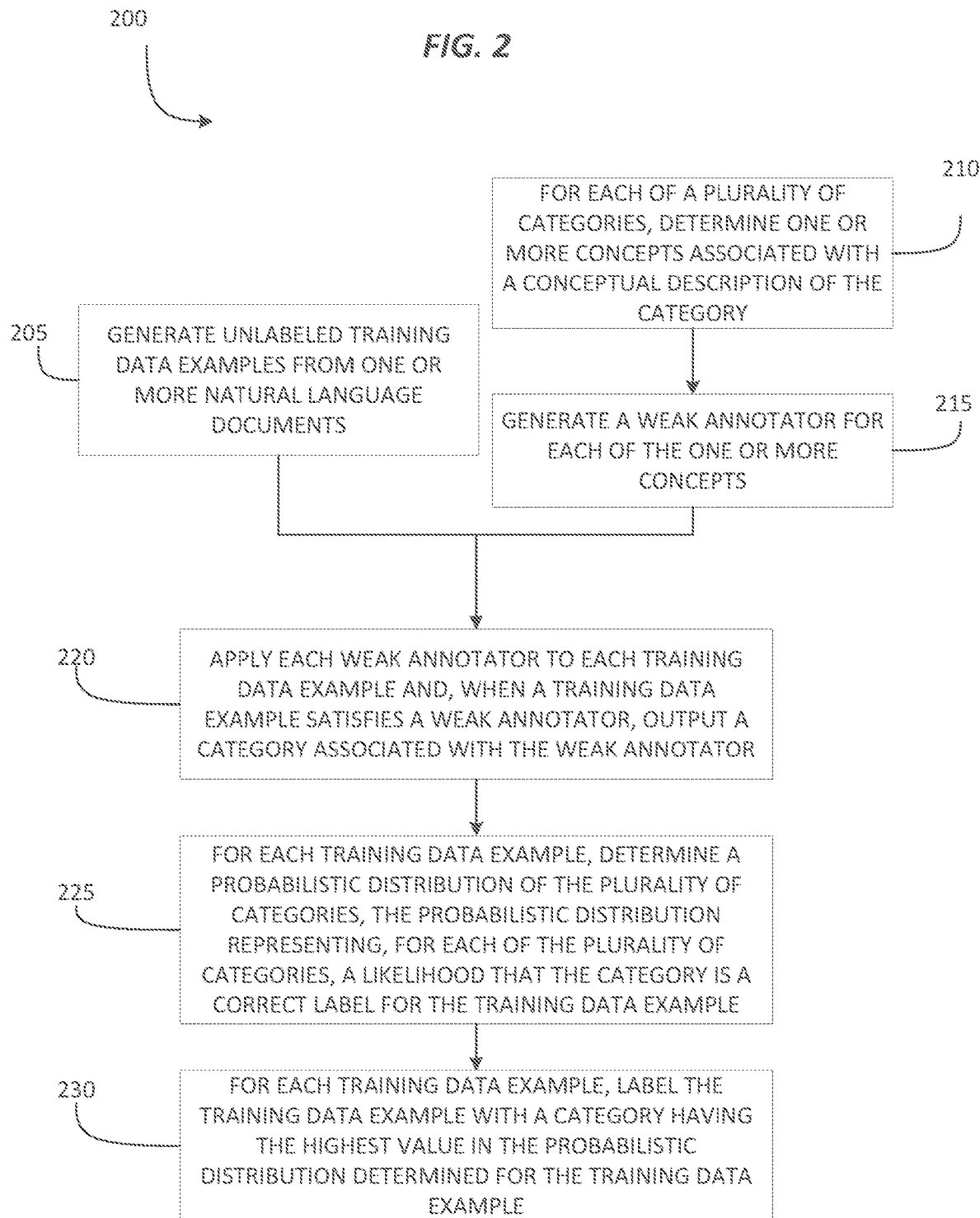
FIG. 2 is an example flowchart of a method of using the system of FIG. 1 for automatically labeling data using conceptual descriptions according to one embodiment.

FIG. 2 is a flow chart illustrating an example method 200 for automatically labeling data using conceptual descriptions. In some embodiments, before the method 200 begins when the electronic processor 120 executes the natural language document pre-processor 135 to produce one or more natural language documents in a state in which training data examples may be extracted from the document. For example, when the electronic processor 120 executes the natural language document pre-processor 135, the electronic processor 120 may extract text from natural language documents (for example, PDFs, webpages, and the like). The electronic processor 120 may also tokenize the extracted text (for example, each word may be a token, each sentence may be a token, or the like), split the text into sentences, annotate each token with a part of speech tag, annotate dependency relations for pairs of word, a combination of the foregoing, and the like.

The method 200 begins at step 205 when the electronic processor 120 executes the training data example extractor 140 to generate unlabeled training data examples from one or more natural language documents (for example, those natural language documents pre-processed as described above). In some embodiments, the electronic processor 120 extracts training data examples from natural language documents using dependency relations. For example, given the sentence, "Tom broke his left leg when he was hit by a car," the electronic processor 120 extracts a training data example by using dependency relations between "Tom," "break," and "leg." The dependency relation between "Tom" and "break" is that "Tom" is the subject of the predicate "break" ("Tom"—nsubj—"break") and the dependency relation between "leg" and "break" is that "leg" is the object of the predicate "break" ("break"—dobj—"leg"). In some embodiments, the electronic processor 120 represents extracted training data examples as tuples including parts of speech of a natural language sentence. For example, a training data example may be represented as a four-element tuple <Agent, Predicate, Object, Preposition Phrase>. In this example, a tuple may be <I, went to, shopping, yesterday>. It should be understood that the number and type of elements included in a tuple (or training data example) may vary depending on the task the machine learning system 170 is being trained to perform.

At step 210, the electronic processor 120 executes the conceptual description decomposer 145 to determine, for each of a plurality of categories, one or more concepts associated with a conceptual description of the category. In some embodiments, the electronic processor 120 automatically extracts unigram and bigram keywords from the conceptual description as concepts by removing stop words and non-important words from the conceptual description. The automatically extracted concepts may be noisy. For example, the given the description "The physiological needs include the need to be able to breathe beneficial or pleasant air, and to avoid unpleasant air" for the category "Physiological needs," the electronic processor 120 may generate the concepts "air," "breathe air," "beneficial air," and "pleasant air." However, "breathe air," "beneficial air," and "pleasant air" may be noisy concepts because they are made redundant by the category "air." In some embodiments, the electronic processor 120 is configured to eliminate noisy concepts using heuristic rules. For example, the electronic processor 120 may use word frequency to filter some high frequency concepts. For example, in the example above, air is mentioned many times, so it's probable that "air" is the focal concept and "breathe air," "beneficial air," and "pleasant air" may be eliminated from the group of concepts. In other embodiments, the electronic processor 120 is configured to execute a reinforced learning algorithm to eliminate noisy concepts and identify the most accurate and important extracted concepts. An example conceptual description of a category "Physiological Needs" is illustrated in FIG. 3. Using the conceptual description shown in FIG. 3, at step 210 the electronic processor 120 determines concepts associated with the category, in this case the category and concepts respectively are "Physiological Needs": food, air, beverage, sleep, drink, warmth, and breathe air. It should be understood that concepts considered noisy in some applications of the embodiments described herein may not be considered in all applications of the embodiments described herein. For example, depending on the number of categories and what those categories are, "breathe air" may or may not be a noisy concept.

At step 215, the electronic processor 120 executes the weak annotator generator 150 to generate a weak annotator for each of the one or more concepts generated at step 210. A weak annotator is associated with the same category as the concept that the weak annotator was generated for. A weak annotator is a function that takes a training data example as input and, when the input training data example satisfies the criteria of the function, outputs the category that the weak annotator is associated with. At step 215, weak annotators will be generated for the one or more concepts generated for the plurality of categories. For example, for the "Physiological Needs" category the following weak annotators are generated: A(food), A(air), A(beverage), A(sleep), A(drink), A(warmth), and A(breathe air).

In some embodiments, weak annotators utilize concept-instance matching to determine whether a training data example is associated with a category. In concept-instance matching, if a training data example contains a term that is an instance of a concept, the category associated with the concept is output for the training data example. For example, given a weak annotator (A(food)) created for the concept "food" and a training data example "<I, had, burger, >," A(food) outputs the category "Physiological Needs" because the term "burger" included in the training data example is an instance of the concept "food." When given the training example "<I, broke, my leg, >," A(food) does not output a category because the training data example does not include an instance of the concept "food."

In other embodiments, weak annotators utilize word embeddings to compute the similarity between a concept associated with a weak annotator and a training data example. Based on a computed similarity, a weak annotator determines whether to output a category for a training data example. For example, when the computed similarity between a concept associated with a weak annotator and a training data example is larger than a predetermined threshold, the weak annotator may output a category label.

At step 220, the electronic processor 120, executes the weak annotator executor 155 to apply each weak annotator to each training data example and, if a training data example satisfies a weak annotator, output a category associated with the weak annotator. The result of the electronic processor 120 performing step 220 is a label matrix in which each row corresponds to a training data example and each column corresponds to a weak annotator. A cell in the label matrix includes a category if the training data example associated with the row of the cell satisfies the weak annotator associated with the column of the cell, otherwise the cell is empty. An example label matrix is shown in FIG. 4. In the example included in FIG. 4, cell 400 includes the category "Health" because training data example-1 (included in row 405) satisfies the weak annotator A(broke) (included in column 410). Cell 415 is blank because training data example-1 of row 405 does not satisfy the weak annotator A(beverage) (included in column 420).

At step 225, the electronic processor 120 executes the label aggregator 160 to determine, for each training data example, a probabilistic distribution of the plurality of categories, the probabilistic distribution representing, for each of the plurality of categories, a likelihood that the category is a correct label for the training data example. In some embodiments, to obtain the probabilistic distribution, the electronic processor 120, for each category that was output for the training data example, counts the number of times the category is included in the row of the label matrix assigned to the training data example and normalizes each count. In some embodiments, the electronic processor 120 uses a graphical model applied to the label matrix to automatically learn a probabilistic distribution of categories for each training data example. The result of the electronic processor 120 executing the label aggregator 160 is a probabilistic matrix listing training data examples, each associated with a probabilistic distribution over the plurality of categories. An example probabilistic matrix is shown in FIG. 5.

At step 230, the electronic processor 120, for each training data example, labels the training data example with a category having the highest value in the probabilistic distribution determined for the training data example. For example, in the probabilistic matrix of FIG. 5, training data example-1 is associated with the category "Physiological Needs" because the value assigned to "Physiological Needs" in the probabilistic distribution determined for training data example-1 is higher than the values assigned to "Health Needs" and "Social Needs," respectively.

In some embodiments, the electronic processor 120 executes the training example selector 165, to select training data examples to use to train a machine learning system (for example, the machine learning system 170), based on the probabilistic distributions associated with the training data examples. In some embodiments, the electronic processor 120 selects, for usage to train the machine learning system 170, each training data example which has a category that it is likely to be associated with. A category is likely to be associated with a training data example when a value associated with the category and included in the probabilistic distribution determined for the training data example is above a predetermined threshold. For example, if in the probabilistic matrix generated at step 225, a training data example is above seventy percent (0.7) likely to be associated with a category and the predetermined threshold is 0.6, the training data example is selected for training the machine learning system 170. When selecting training data examples to use to train a machine learning system, it is important to obtain balanced set of training data examples for each category. A skewed or unbalanced set of training data examples often causes a machine learning system to incorrectly classify natural language passages as belonging to the category which was associated with the largest number of training data examples. Ideally, the set of training data examples would have the same distribution per category as the natural language documents that the trained machine learning system will evaluate. In some embodiments, the electronic processor 120 receives (for example, from an administrative user, a data scientist, a software engineer, or the like via the communication network 115 or an input device) a number or a percentage for each category and selects training data examples for each category based on the received numbers or percentages.

In some embodiments, the machine leaning system 170 is trained using the labeled training data examples selected by the electronic processor 120. The machine learning system 170 may be a support vector machine, a logistic regression, a neural network, a Bayesian network, or the like. Once the machine learning system 170 is trained, it may be used to categorize natural language passages.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Thus, the embodiments described herein provide, among other things, a system and a method for automatically labeling data using conceptual descriptions. Various features and advantages of the embodiments are set forth in the following claims.

What is claimed is:

1. A system for automatically labeling data using conceptual descriptions, the system comprising an electronic processor configured to
generate unlabeled training data examples from one or more natural language documents;
for each of a plurality of labels,
determine one or more concepts associated with the label, wherein a concept is a unigram or bigram keyword included in a conceptual description of the label; and
for each of the one or more concepts determined for the label, generate a weak annotator associated with the concept and the label, wherein the weak annotator is a function that, given a training data example as input, is satisfied when the training data example is associated with the concept;
for each training data example,
apply each weak annotator to the training data example and, when the training data example satisfies a weak annotator, record the label associated with the weak annotator in a cell associated with the training data example and included in a label matrix;
determine a probabilistic distribution of the plurality of labels, wherein the probabilistic distribution represents, for each of the plurality of labels, a likelihood that the label is a correct label for the training data example and wherein the probabilistic distribution is based on, for each label included in the plurality of labels, a number of cells associated with the training data example and included in the label matrix that the label is recorded in; and
label the training data example with a label of the plurality of labels having the highest value in the probabilistic distribution determined for the training data example;
train the machine learning system using the labeled training examples; and
execute the trained machine learning system to categorize a natural language passage.

2. The system according to claim 1, wherein the electronic processor is further configured to select training data examples, based on the probabilistic distributions associated with the training data examples, to use to train a machine learning system.

3. The system according to claim 2, wherein the electronic processor is further configured to select training data examples to use to train a machine learning system when a value included in a probabilistic distribution determined for a training data example is above a predetermined threshold.

4. The system according to claim 1, wherein the electronic processor is further configured to produce one or more natural language documents in a state in which training data examples may be extracted from the one or more natural language documents by
extracting text from the natural language documents;
tokenizing the extracted text;
splitting the text into sentences;

annotating each token with a part of speech tag; and
annotating the dependency relations for pairs of words.

5. The system according to claim 1, wherein the electronic processor is configured to apply each weak annotator to the training data example and, when the training data example satisfies a weak annotator, record the label associated with the weak annotator in a cell associated with the training data example and included in a label matrix by
recording the label associated with the weak annotator in the cell associated with the training data example and included in the label matrix, when the training data example contains a term that is an instance of the concept.

6. The system according to claim 1, wherein the electronic processor is configured to apply each weak annotator to the training data example and, when the training data example satisfies a weak annotator, record the label associated with the weak annotator in a cell associated with the training data example and included in a label matrix by
computing, using word embeddings, a similarity between a concept associated with the weak annotator and the training data example; and
based on the computed similarity, determining whether to record the label associated with the weak annotator in the cell associated with the training data example and included in the label matrix.

7. The system according to claim 1, wherein a training data example is a tuple including parts of speech of a natural language sentence.

8. The system according to claim 1, wherein the electronic processor is further configured to remove noisy concepts from the one or more concepts.

9. A method for automatically labeling data using conceptual descriptions, the method comprising:
generating, with an electronic processor, unlabeled training data examples from one or more natural language documents;
for each of a plurality of labels,
determining one or more concepts associated with the label, wherein a concept is a unigram or bigram keyword included in a conceptual description of the label; and
for each of the one or more concepts determined for the label, generating a weak annotator associated with the concept and the label, wherein the weak annotator is a function that, given a training data example as input, is satisfied when the training data example is associated with the concept;
for each training data example,
applying each weak annotator to the training data example and, when the training data example satisfies a weak annotator, recording the label associated with the weak annotator in a cell associated with the training data example and included in a label matrix;
determining a probabilistic distribution of the plurality of labels, wherein the probabilistic distribution represents, for each of the plurality of labels, a likelihood that the label is a correct label for the training data example and wherein the probabilistic distribution is based on, for each label included in the plurality of labels, a number of cells associated with the training data example and included in the label matrix that the label is recorded in; and
labeling the training data example with a label of the plurality of labels having the highest value in the probabilistic distribution determined for the training data example;
training the machine learning system using the labeled training examples; and
executing the trained machine learning system to categorize a natural language passage.

10. The method according to claim 9, the method further comprising selecting training data examples, based on the probabilistic distributions associated with the training data examples, to use to train a machine learning system.

11. The method according to claim 10, the method further comprising selecting training data examples to use to train a machine learning system when a value included in a probabilistic distribution determined for a training data example is above a predetermined threshold.

12. The method according to claim 9, the method further comprising producing one or more natural language documents in a state in which training data examples may be extracted from the one or more natural language documents by
extracting text from the natural language documents;
tokenizing the extracted text;
splitting the text into sentences;
annotating each token with a part of speech tag; and
annotating the dependency relations for pairs of words.

13. The method according to claim 9, wherein applying each weak annotator to the training data example and, when the training data example satisfies a weak annotator, recording the label associated with the weak annotator in a cell associated with the training data example and included in a label matrix includes
recording the label associated with the weak annotator in the cell associated with the training data example and included in the label matrix and, when the training data example contains a term that is an instance of the concept.

14. The method according to claim 9, wherein applying each weak annotator to the training data example and, when the training data example satisfies a weak annotator, recording the label associated with the weak annotator in a cell associated with the training data example and included in a label matrix includes
computing, using word embeddings, a similarity between a concept associated with the weak annotator and the training data example; and
based on the computed similarity, determining whether to record the label associated with the weak annotator in the cell associated with the training data example and included in the label matrix.

15. The method according to claim 9, wherein a training data example is a tuple including parts of speech of a natural language sentence.

16. The method according to claim 9, the method further comprising removing noisy concepts from the one or more concepts.

* * * * *